(12) United States Patent
Shikii et al.

(10) Patent No.: US 8,264,636 B2
(45) Date of Patent: Sep. 11, 2012

(54) LASER BACKSIDE IRRADIATION DEVICE AND LIQUID CRYSTAL DISPLAY DEVICE

(75) Inventors: Shinichi Shikii, Nara (JP); Kenji Nakayama, Osaka (JP); Tetsuro Mizushima, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 381 days.

(21) Appl. No.: 12/596,616

(22) PCT Filed: Apr. 10, 2008

(86) PCT No.: PCT/JP2008/000947
§ 371 (c)(1),
(2), (4) Date: Oct. 19, 2009

(87) PCT Pub. No.: WO2008/132796
PCT Pub. Date: Nov. 6, 2008

(65) Prior Publication Data
US 2010/0045896 A1    Feb. 25, 2010

(30) Foreign Application Priority Data
Apr. 20, 2007   (JP) .................................. 2007-111274

(51) Int. Cl.
*G02F 1/1335* (2006.01)
(52) U.S. Cl. .......................................... 349/61; 349/62
(58) Field of Classification Search .................... 349/61, 349/62
See application file for complete search history.

(56) References Cited

U.S. PATENT DOCUMENTS

| | | | | |
|---|---|---|---|---|
| 7,580,083 B2 * | 8/2009 | Jung | ................................. | 349/5 |
| 2006/0262243 A1 * | 11/2006 | Lester et al. | .................... | 349/71 |
| 2007/0273810 A1 * | 11/2007 | Lee et al. | ........................ | 349/65 |

FOREIGN PATENT DOCUMENTS

| JP | 2-157790 | 6/1990 |
|---|---|---|
| JP | 3205478 | 6/2001 |
| WO | 2007/074784 | 7/2007 |
| WO | 2007/074787 | 7/2007 |

OTHER PUBLICATIONS

International Search Report issued Jul. 15, 2008 in International (PCT) Application No. PCT/JP2008/000947.

* cited by examiner

*Primary Examiner* — James Dudek
(74) *Attorney, Agent, or Firm* — Wenderoth, Lind & Ponack, L.L.P.

(57) ABSTRACT

Provided are a laser backside irradiation device and a liquid crystal display device reducing a thickness of the respective device and improving a contrast while making a luminance distribution substantially uniform. The laser backside irradiation device includes a laser light source, a splitting optical system splitting laser light emitted from the laser light source into a plurality of laser beams, and a plurality of illumination optical systems illuminating a liquid crystal panel for two-dimensionally modulating a light intensity from a backside thereof, wherein the illumination optical systems expand the laser beams split by the splitting optical system to illuminate divided regions on the liquid crystal panel, respectively.

17 Claims, 15 Drawing Sheets

LASER BACKSIDE IRRADIATION DEVICE AND LIQUID CRYSTAL DISPLAY DEVICE

TECHNICAL FIELD

The present invention relates to a laser backside irradiation device incorporated with a light source for emitting light of mainly three colors of R (red), G (green), and B (blue), and a liquid crystal display device incorporated with the laser backside irradiation device.

BACKGROUND ART

Display devices are mainly classified into light emitting display devices which emit light by itself, such as an organic light emitting display device and a plasma display device; and light receiving display devices which do not emit light by itself and require a light source, such as a liquid crystal display device. A general liquid crystal display device includes two display plates provided with electric field generating electrodes, and a liquid crystal layer disposed between the display plates and having a dielectric constant anisotropy. In the liquid crystal display device, an electric voltage is applied to the electric field generating electrodes to generate an electric field in the liquid crystal layer, the electric voltage is changed to adjust the intensity of the electric field to thereby form a light valve, and the transmittance of light to be transmitted through the liquid crystal layer is adjusted, whereby an intended image is obtained. Generally, an artificial light source as an additional element is used as the light source in the above arrangement. It is often the case that a fluorescent lamp such as a cold cathode fluorescent lamp (CCFL) is used as a light source, in a liquid crystal display device, for uniformly irradiating light onto the entirety of a liquid crystal panel at a rear surface of the liquid crystal panel. Normally and generally, light of a fluorescent lamp which is incident from a side surface of a light guiding plate irradiates a liquid crystal panel from a rear surface thereof, as substantially uniform light through a front surface of the light guiding plate.

In recent years, there has been developed an image display device incorporated with a light emitting diode (LED) or a laser device, as a light source free of mercury and having less electric power consumption, considering environmental issues and in the aspect of electric power saving. In particular, a laser device is said to be an optimum light source for an image display device, in the aspect of image quality such as a broad color reproducing area as well as its low electric power consumption, if used as a light source for an image display device.

Further, several methods are proposed in uniformly irradiating light onto the entirety of a liquid crystal panel at a rear surface of the liquid crystal panel, using a laser device as a light source. One of the methods is a method for scanning a liquid crystal panel by a polygonal scanner, as recited in patent literature 1. Another method is a method for scanning a liquid crystal panel by a line scanner, as recited in patent literature 2.

In the scanning method using a polygonal scanner as recited in patent literature 1, since the distance from a surface of the polygonal scanner to the liquid crystal panel is long, it is fundamentally difficult to reduce the thickness of the device as achieved in the arrangement of using a CCFL or a like device as a light source. In the method for scanning a liquid crystal panel with a line scanner, as recited in patent literature 2, it is fundamentally difficult to scan a large screen at a high speed. Accordingly, it may be practically infeasible to apply the latter method to a display device. As described above, heretofore, there has not been proposed an idea of reducing the thickness of a liquid crystal display device in backside irradiation of a liquid crystal panel using a laser device as a light source.

Patent literature 1: Japanese Unexamined Patent Publication No. Hei 2-157790

Patent literature 2: Japanese Patent No. 3205478

DISCLOSURE OF THE INVENTION

In view of the above, it is an object of the present invention to provide a laser backside irradiation device and a liquid crystal display device that enable to reduce the thickness of the device, and improve the contrast while making the luminance distribution substantially uniform.

A laser backside irradiation device according to an aspect of the invention includes: a laser light source; a splitting optical system for splitting laser light emitted from the laser light source into a plurality of laser beams; and a plurality of illumination optical systems for illuminating a two-dimensional spatial modulator for two-dimensionally modulating a light intensity from a backside thereof, wherein the illumination optical systems expand the laser beams split by the splitting optical system to illuminate divided regions on the two-dimensional spatial modulator, respectively.

A liquid crystal display device according to another aspect of the invention includes the aforementioned laser backside irradiation device; and a two-dimensional spatial modulator to be irradiated by the laser backside irradiation device, and for two-dimensionally modulating a light intensity.

According to the present invention, since the divided regions on the two-dimensional spatial modulator are illuminated by the illumination optical systems, respectively, even if the size of the two-dimensional spatial modulator is increased, the thickness of the device can be reduced without changing the thickness of the device, by increasing the number of regions to be divided. Further, since the divided regions on the two-dimensional spatial modulator are illuminated by the illumination optical systems, respectively, the contrast can be improved, while making the luminance distribution of light to be irradiated onto the two-dimensional spatial modulator substantially uniform.

These and other objects, features and advantages of the present invention will become more apparent upon reading the following detailed description along with the accompanying drawings.

BEST MODE FOR CARRYING OUT THE INVENTION

In the following, an embodiment of the invention is described referring to the accompanying drawings. The following embodiment is merely an example embodying the invention, and does not limit the technical scope of the invention.

Figure 1:
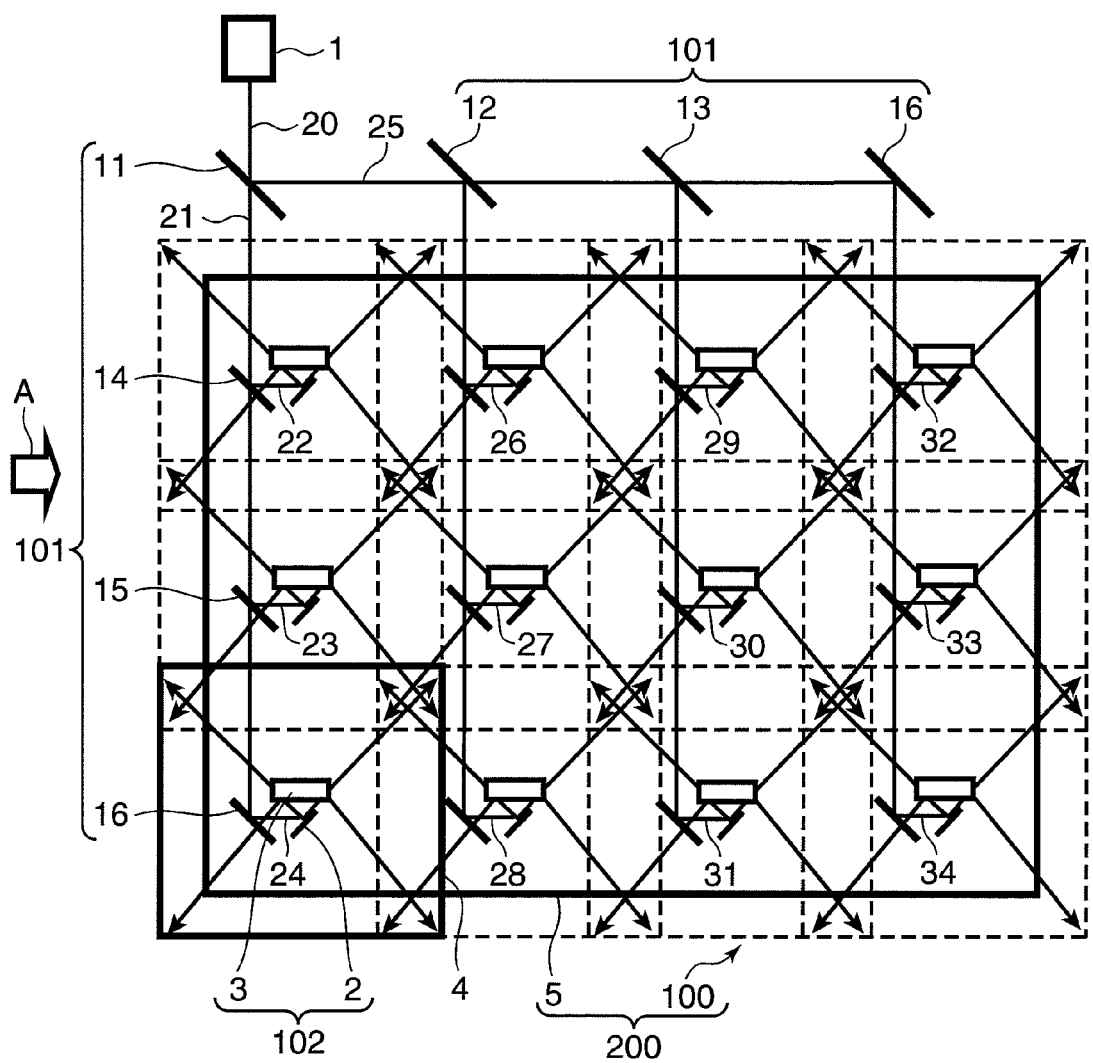
FIG. 1 is a front view showing an arrangement of a liquid crystal display device embodying the invention.
Figure 2:
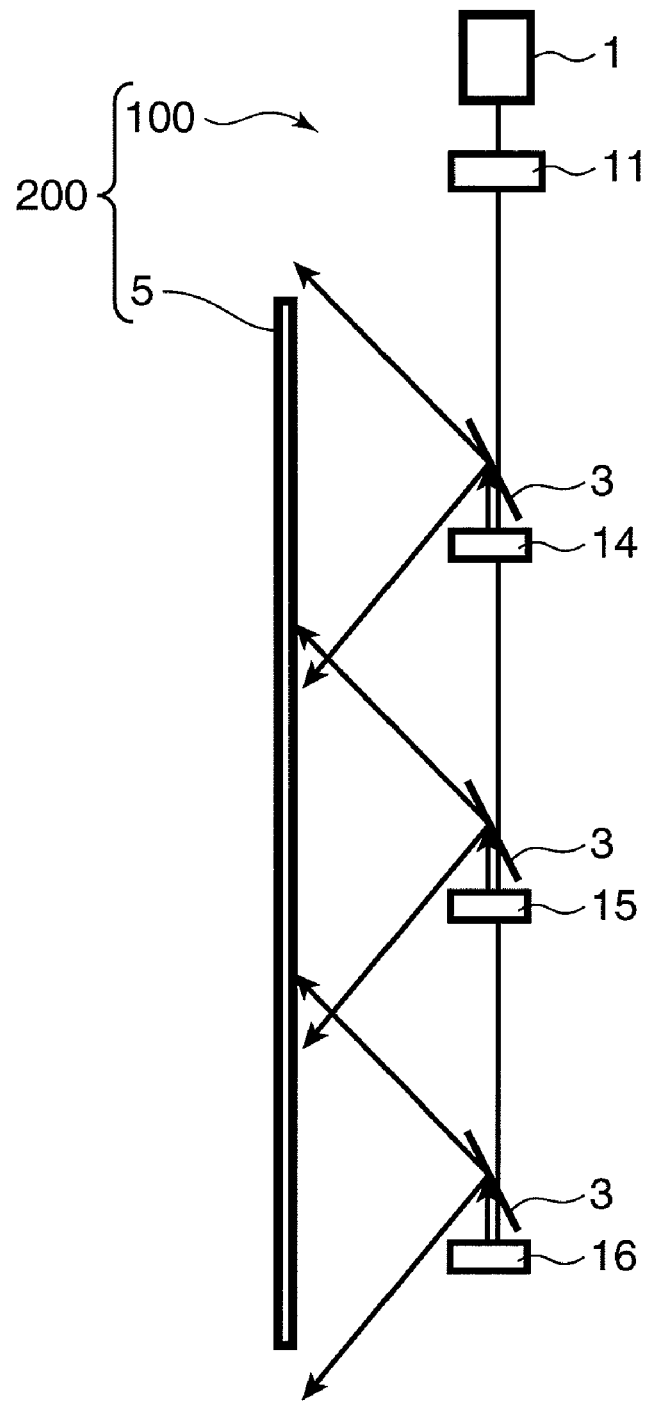
FIG. 2 is a side view of the liquid crystal display device in the direction of the arrow A in FIG. 1.

FIG. 1 is a front view showing an arrangement of a liquid crystal display device embodying the invention. FIG. 2 is a side view of the liquid crystal display device viewed in the direction of the arrow A in FIG. 1. A liquid crystal display device 200 shown in FIG. 1 includes a laser backside irradiation device 100 and a liquid crystal panel 5. The laser backside irradiation device 100 includes a laser light source 1, a splitting optical system 101, and plural illumination optical systems 102. The splitting optical system 101 is constituted of beam splitters 11, 12, 13, 14, and 15, and mirrors 16. Each of the illumination optical systems 102 is constituted of a first reflecting element 2 and a second reflecting element 3.

The laser light source 1 emits laser light. The splitting optical system 101 splits the laser light emitted from the laser light source 1 into plural laser beams. The illumination optical systems 102 illuminate the liquid crystal panel 5 from the backside thereof. The liquid crystal panel 5 is a two-dimensional space modulator for two-dimensionally modulating a light intensity. The illumination optical systems 102 expand the laser beams split by the splitting optical system 101 to illuminate divided regions on the liquid crystal panel 5, respectively.

In the following, an operation of the above arrangement is described. First, an operation as to how the splitting optical system 101 splits laser light 20 into N laser beams is described. In this embodiment, an example is described, wherein the splitting optical system 101 splits the laser light 20 into N laser beams, where N=three columns in vertical direction×four rows in horizontal direction=12.

The laser light 20 emitted from the laser light source 1 is split into laser beams with a predetermined light amount ratio by the beam splitter 11. First, a laser beam 21 transmitted through the beam splitter 11 impinges on the beam splitter 14. The beam splitter 14 generates a laser beam 22 by reflecting the laser beam 21 at a predetermined light amount ratio. Then, the laser beam 21 of a predetermined light amount that has been transmitted through the beam splitter 14 impinges on the beam splitter 15. The beam splitter 15 generates a laser beam 23 by reflecting the laser beam 21 at a predetermined light amount ratio. Then, the laser beam 21 of a predetermined light amount that has been transmitted through the beam splitter 15 impinges on the mirror 16. Finally, the laser beam 21 that has impinged on the mirror 16 turns into a laser beam 24 by substantially total reflection on the mirror 16. Thus, the laser light 20 can be split into laser beams corresponding to three columns in vertical direction.

Next, a method for splitting laser light into laser beams corresponding to four rows in horizontal direction is described. Out of the laser light 20, a laser beam 25 reflected on the beam splitter 11 is split into a transmitted beam and a reflected beam at a predetermined light amount ratio by the beam splitter 12. The laser beam transmitted through the beam splitter 12 is incident into the beam splitter 13, where the incident beam is split into a transmitted beam and a reflected beam at a predetermined light amount ratio. Then, the laser beam transmitted through the beam splitter 13 is reflected on the mirror 16 and propagated downwardly in FIG. 1. Similarly to the laser beam 21, laser beams respectively reflected on the beam splitter 12, the beam splitter 13, and the mirror 16 are propagated downwardly in FIG. 1, while being reflected on the beam splitters disposed in the respective columns and the mirror, and impinge at predetermined positions as laser beams 26, 27, 28, 29, 30, 31, 32, 33, and 34. By performing the above operation, the laser light 20 emitted from the laser light source 1 is spilt into twelve laser beams=three columns in vertical direction×four rows in horizontal direction. The N=twelve laser beams respectively illuminate regions (segments) on the liquid crystal panel 5, which are partitioned by the broken lines and the solid lines in FIG. 1.

Figure 3:
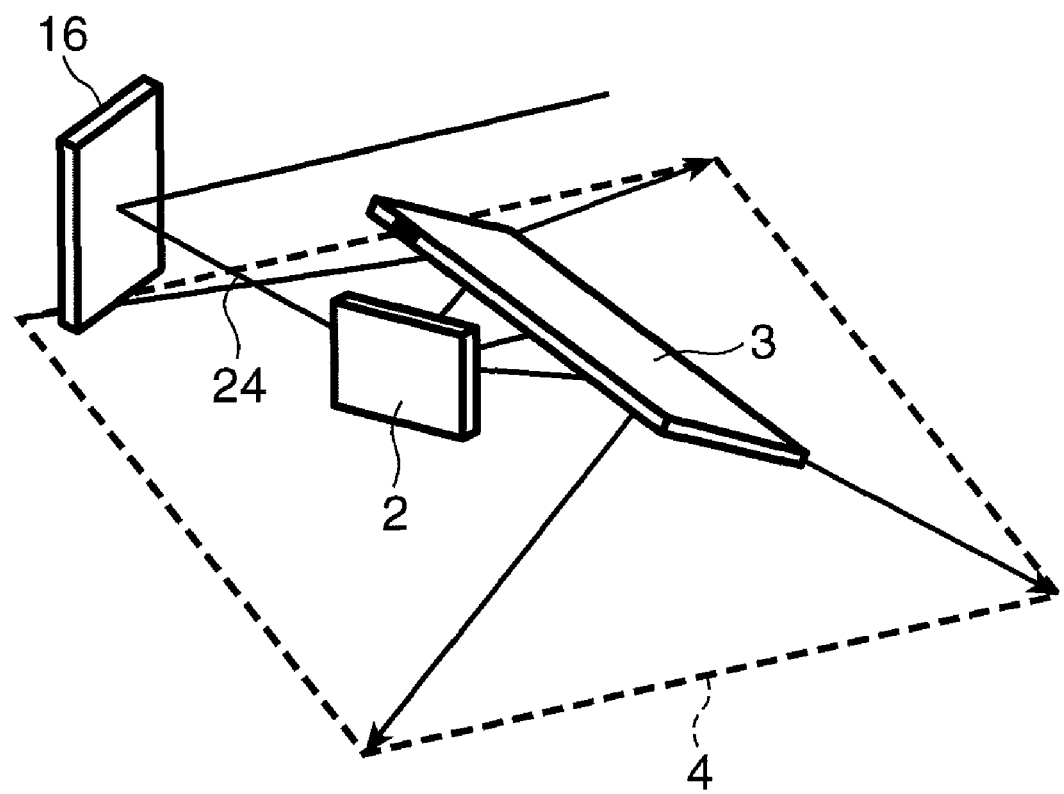
FIG. 3 is a perspective view showing an arrangement of an illumination optical system for guiding a laser beam reflected on a mirror shown in FIG. 1 to a liquid crystal panel.
Figure 4:
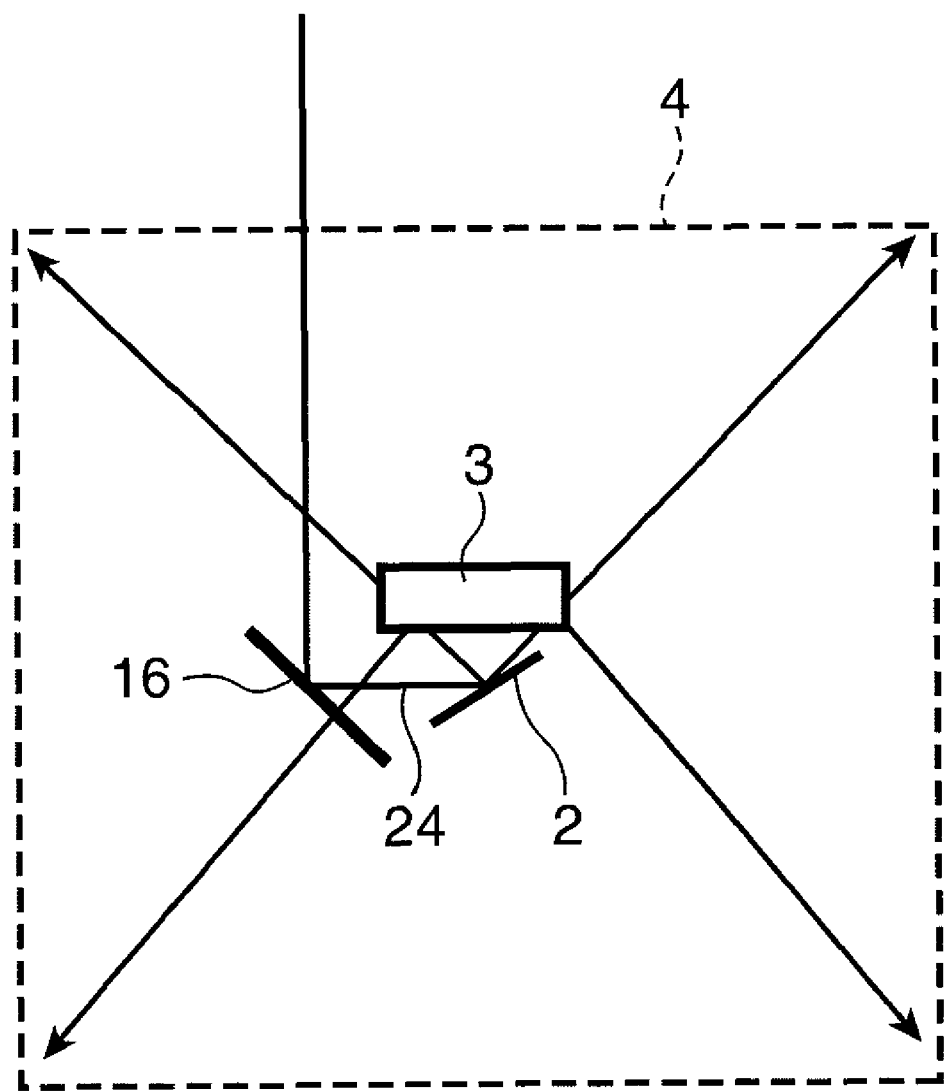
FIG. 4 is a front view of the illumination optical system shown in FIG. 3.
Figure 5:
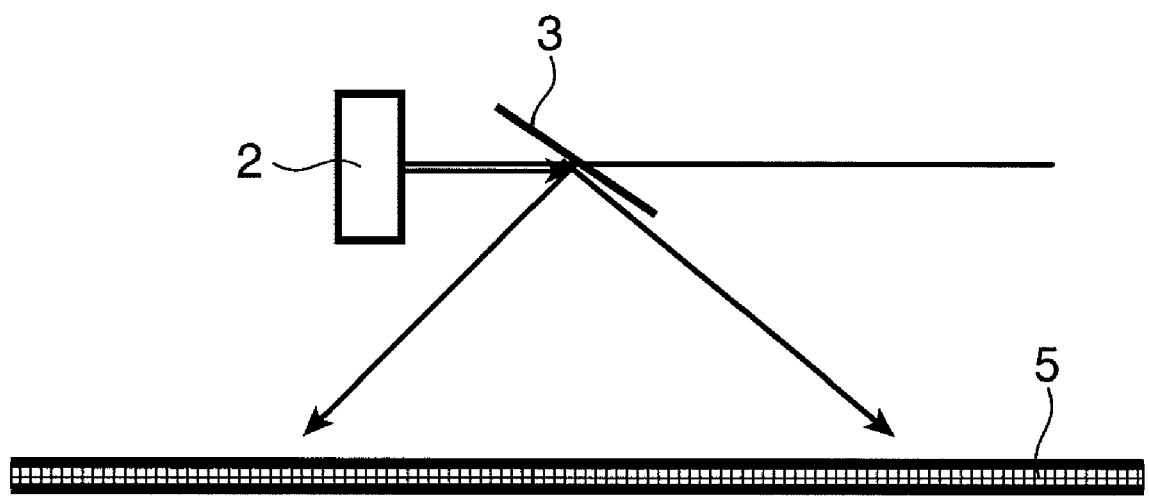
FIG. 5 is a side view of the illumination optical system shown in FIG. 3.

The illumination optical system 102 is prepared in plural number. In this embodiment, the N=twelve illumination optical systems 102 corresponding to three columns in vertical direction×four rows in horizontal direction are disposed in a matrix. An exemplified illumination optical system 102 corresponding to a segment 4 on the liquid crystal panel 5 to be illuminated by the laser beam 24 obtained by splitting laser light into N=twelve laser beams, is described referring to FIGS. 3, 4, and 5. FIG. 3 is a perspective view showing an arrangement of an illumination optical system for guiding a laser beam reflected on the mirror 16 in FIG. 1 to the liquid crystal panel 5. FIG. 4 is a front view of the illumination optical system shown in FIG. 3. FIG. 5 is a side view of the illumination optical system shown in FIG. 3.

The laser beam 24 reflected on the mirror 16 is reflected on the first reflecting element 2, and propagated toward the second reflecting element 3 while diffusing in a horizontal plane. The propagated laser beam 24 is reflected on the second reflecting element 3 and propagated downwardly while two-dimensionally diffusing. The propagated laser beam 24 illuminates the segment 4 in the liquid crystal panel 5. As described above, each of the illumination optical systems 102 two-dimensionally diffuses parallel beams, and illuminates the corresponding segment. The above arrangement enables to illuminate the liquid crystal panel 5 with N laser beams by dividing a single laser beam into N laser beams.

The following two effects are conceived as examples of the effects of the embodiment. One is that backside irradiation optical systems for liquid crystal panels with thickness substantially identical to each other can be constructed with use of a single laser light source, even if the size of the liquid crystal panel 5 is increased. A backside irradiation device incorporated with the laser device as recited in patent literature 1, as a light source, illuminates a liquid crystal panel by a single optical system, without dividing the liquid crystal panel into segments, unlike the embodiment. In this arrangement, the optical distance from the liquid crystal panel to the light source is increased in proportion to the size of the liquid crystal panel, thereby increasing the size of the device. Further, in the case where the thickness of a backside irradiation device is reduced in a condition that the size of a liquid crystal panel is increased, an arrangement of e.g. folding an optical system is necessary. Accordingly, a complicated optical system incorporated with e.g. an aspherical mirror is required, which considerably increases the production cost.

In the case where a laser device is used as a light source, in place of a CCFL, and the thickness of the device is reduced by an arrangement of illuminating a light guiding plate with use of a rotating polygonal mirror and an a scanning optical system, if the size of a screen is increased, the size of a scanning lens constituting the scanning optical system is increased. As a result, the scanning lens cannot be commonly used between screens of different sizes, and an identical production step cannot be employed. Thus, a considerable cost increase is inevitable in the aspect of producing a device properly. Further, optimum designing of an element such as a scanning lens constituting a scanning optical system is required with respect to each of the screen sizes. Thus, a certain time is required to prepare devices of the same type with different screen sizes in the aspect of the number of design steps.

On the other hand, the laser backside irradiation device 100 in this embodiment is advantageous in keeping the thickness of the device basically unchanged by increasing the number of segments, even if the size of a liquid crystal panel is increased. In the laser backside irradiation device 100 in this embodiment, even if the size of a screen to be used is increased, a cost increase can be maximally suppressed by increasing the number of segments, only accompanied with an increase in the number of beam splitters and the number of reflecting elements. Also, even if the number of screen sizes is increased with respect to devices of the same type, designing concerning an increase in the screen size can be easily performed simply by increasing the number of segments in designing an optical system. Further, parts can be commonly used among screens of different sizes. Thus, the laser backside irradiation device 100 can be fabricated with enhanced mass productivity and at a low cost.

In a backside irradiation device for a liquid crystal panel using an LED as a light source, since the size of a segment to be illuminated by one LED is the same among the LEDs, the number of LEDs is increased depending on the size of a liquid crystal panel. An increase in the number of LEDs depending on the size of a liquid crystal panel results in an increase in the number of drive substrates for LEDs, and results in an increase in the number of parts i.e. the drive substrates, thus causing a production cost increase. On the other hand, use of the laser backside irradiation device 100 in this embodiment eliminates the need of increasing the number of drive circuits for a laser light source, even if the size of a liquid crystal panel is increased, only accompanied with an increase in the number of parts such as beam splitters and reflecting elements. Thus, a cost increase can be maximally suppressed. Further, use of a fiber light source as a light source has an advantage that the brightness (light amount) and the color (wavelength) can be optionally switched over by replacing a fiber light source to be used.

As shown in FIG. 1, in the case where all the laser beams emitted from the splitting optical system are propagated in directions substantially identical to each other, in other words, in the case where the laser beams 22 through 24 transmitted through the beam splitter 11 and emitted from the splitting optical system, the laser beams 26 through 28 reflected on the beam splitter 12 and emitted from the splitting optical system, the laser beams 29 through 31 reflected on the beam splitter 13 and emitted from the splitting optical system, and the laser beams 32 through 34 reflected on the mirror 16 and emitted from the splitting optical system are directed in propagating directions substantially identical to each other, as far as the arrangements of the illumination optical systems 102 are identical to each other, polarization directions of laser beams for irradiating the respective segments are substantially aligned with each other.

In FIG. 1, all the N laser beams i.e. the laser beams 22 through 24, and 26 through 34 are propagated in directions substantially identical to each other. Alternatively, propagating directions of a part of the N laser beams may be opposite to propagating directions of the other part of the N laser beams. In other words, propagating directions of all the laser beams to be incident into the illumination optical systems 102 may be substantially identical to each other, or propagating directions of a part of the laser beams to be incident into the illumination optical systems 102 may be opposite to propagating directions of the other part thereof.

Generally, a liquid crystal panel is used in a state that polarizing plates disposed in cross-Nicole position at a front side and a rear side of the liquid crystal panel sandwich the liquid crystal panel therebetween. Accordingly, a component other than a component in a predetermined polarization direction does not contribute to image formation. In other words, substantially a half of the emission light amount is lost, if the polarization direction of light to be emitted is random, as in the case of a CCFL or an LED. Even if a polarizing component which is not transmitted through a liquid crystal panel is reflected by using a special film sheet or a like member to transmit solely a polarizing component which transmits the liquid crystal panel, a light amount loss of 20 to 30% may occur resulting from a transmission loss through the film sheet, or a transmission loss in propagation through a light guiding plate.

In the case where a laser device is used as a light source in place of a CCFL, and an arrangement of illuminating a light guiding plate with use of a rotating polygonal mirror and a scanning optical system is adopted to reduce the thickness of the device, as described above, once laser beams are incident into the light guiding plate, the laser beams are scattered in the light guiding plate due to scattering particles or the like. As a result, even if the polarization directions of laser beams to be incident into the light guiding plate are aligned with each other, the polarization directions of laser beams to be emitted from the light guiding plate may turn into randomly polarized light, similarly to the case of using a CCFL or an LED. As a result, a light amount loss of 20 to 30% may occur.

In the case where a laser device is used as a light source, normally, the polarization directions of light from the laser device are aligned with each other. In view of this, configuring the splitting optical system 101 in such a manner that the propagating directions of laser beams to be emitted from the splitting optical system 101 are aligned with each other, as described above, enables to substantially align the polarization directions of laser light for illuminating a liquid crystal panel with each other. Aligning the polarization directions of polarizing plates disposed on a front side and a rear side of a liquid crystal panel to allow a polarizing component to contribute to image formation is significantly advantageous in remarkably improving the light use efficiency, as compared with an arrangement of using a CCFL or a LED as a light source.

Figure 6:
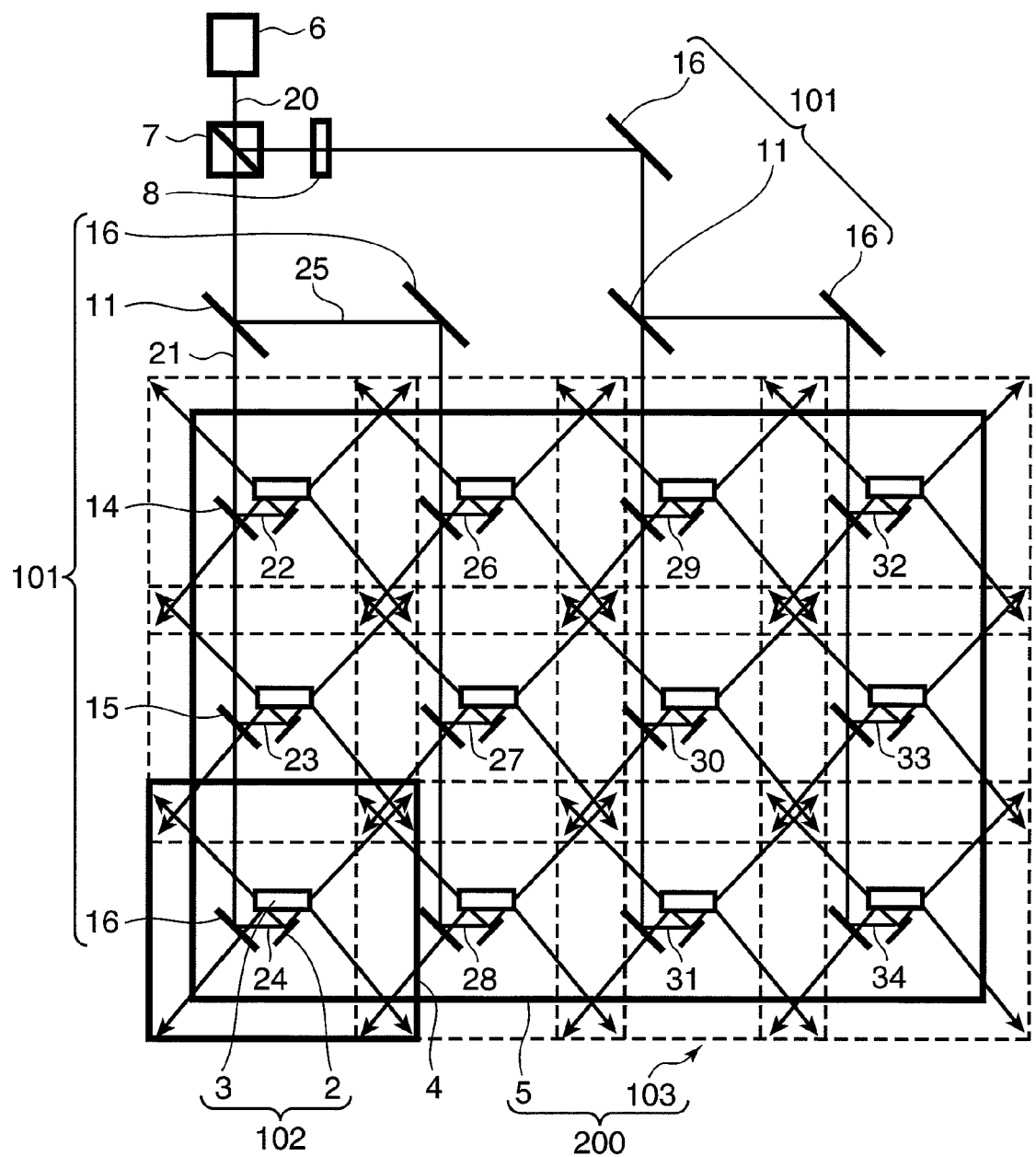
FIG. 6 is a front view showing an arrangement of a liquid crystal display device as a first modification of the embodiment.

As shown in FIG. 6, it is possible to align polarization directions with each other even in use of a light source which may temporarily emit randomly polarized light, such as a fiber light source. FIG. 6 is a front view showing an arrangement of a liquid crystal display device as a first modification of the embodiment. A laser backside irradiation device 103 shown in FIG. 6 includes a fiber light source 6, a polarization beam splitter 7, a half wavelength plate 8, a splitting optical system 101, and plural illumination optical systems 102. The splitting optical system 101 is constituted of beam splitters 11, 12, 13, 14, and 15, and mirrors 16. Each of the illumination optical systems 102 is constituted of a first reflecting element 2 and a second reflecting element 3. In FIG. 6, elements substantially identical or equivalent to those in FIG. 1 are indicated with the same reference numerals, and description thereof is omitted herein.

Laser light 20 emitted from the fiber light source 6 is split into P polarized light and S polarized light by a polarization beam splitter (PBS) 7. The polarization beam splitter 7 transmits a P polarization component of the laser light, and reflects an S polarization component of the laser light. The reflected S polarization component is incident into the half wavelength plate 8. The half wavelength plate 8 converts the incident S polarized light into P polarized light by rotating the polarization direction of the S polarized light by 90°. Thereby, the polarization direction of the polarization component of laser light transmitted through the half wavelength plate 8 is aligned with the polarization direction of the P polarized light transmitted through the polarization beam splitter 7. Each of the P polarized light is split into laser beams corresponding to segments, while propagating along a route shown in FIG. 6 to illuminate the respective corresponding segments.

As described above, even in use of a fiber optical light source as a light source, polarization directions can be aligned with each other with a very simplified construction Thus, the light use efficiency can be remarkably improved, thereby contributing to suppression in electric power consumption.

There is another performance demanded for the backside irradiation device i.e. securing luminance distribution uniformity. The laser backside irradiation device 100, 103 in this embodiment is capable of securing luminance distribution uniformity, as described in the following. First, it is necessary to make the light amounts of split N laser beams substantially equal to each other. In the arrangement of FIG. 1, twelve laser beams=three columns in vertical direction×four rows in horizontal direction are generated by splitting, and it is necessary to make the light amounts of these twelve laser beams substantially equal to each other. Idealistically and preferably, the beam splitter 11 has a transmittance of 25% and a reflectance of 75%, the beam splitter 12, 14 has a transmittance of 66.7% and a reflectance of 33.3%, the beam splitter 13, 15 has a transmittance of 50% and a reflectance of 50%, and the mirrors 16 have a reflectance of 100%.

However, actually, it is difficult to obtain the above idealistic reflectances and transmittances due to a product variation among beam splitters, internal light absorption, light scattering, or the like, and a variation in light amount occurs among the N laser beams. As a result, a variation in luminance of light transmitted through the liquid crystal panel occurs. Further, as the size of the liquid crystal panel is increased, the number of beam splitters to be used is increased, an error in light amount resulting from a variation in transmittance or reflectance is accumulated, and a variation in light amount among the N laser beams is increased. It is needless to say that the luminance distribution can be made substantially uniform by measuring a variation in light amount among the N laser beams, and adjusting the transmittance of a liquid crystal panel with respect to each of the segments. However, in the above arrangement, since the respective light amounts of the N laser beams are adjusted to a smallest laser light amount, a loss of laser power is significantly large, which is not desirable.

Figure 7:
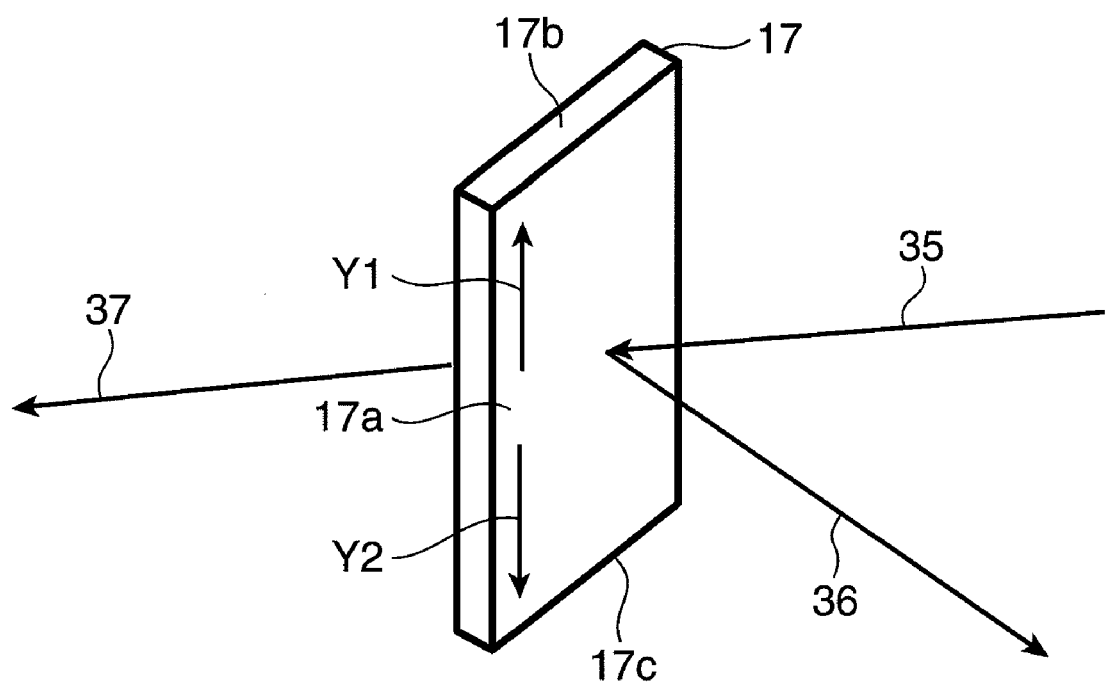
FIG. 7 is a diagram showing an arrangement of a beam splitter in a second modification of the embodiment.

In view of the above, in a laser backside irradiation device as a second modification of the embodiment, a beam splitter, in which at least one of a transmission and a reflection is made non-uniform within a plane, is used. Specifically, use of a beam splitter 17 whose reflectance is increased in a predetermined direction within a reflection plane of the beam splitter, as shown in FIG. 7, enables to make the luminance distribution of split laser beams substantially uniform. FIG. 7 is a diagram showing an arrangement of a beam splitter in the second modification of the embodiment. Since the arrangement of the elements other than the beam splitter in the second modification is substantially the same as the corresponding arrangement in the laser backside irradiation device 100 shown in FIG. 1, description thereof is omitted herein.

Specifically, the beam splitter 17 splits an incident beam 35 into a reflected beam 36 and a transmitted beam 37. The beam splitter 17 is coated with an ND (Neutral Density) filter coat having a property that the reflectance of a central potion 17a is set equal to a design central value, the reflectance is reduced from the central portion 17a toward an upper end 17b of the beam splitter 17, and the reflectance is increased from the central portion 17a toward a lower end 17c. Specifically, the beam splitter 17 is constructed in such a manner that the reflectance thereof is gradually decreased from the central portion 17a in the direction of the arrow Y1, and is gradually increased from the central portion 17a in the direction of the arrow Y2.

In the case where the amount of reflection light is insufficient, the beam splitter 17 is shifted to an upper position. On the other hand, in the case where the amount of reflection light is excessive, the beam splitter 17 is shifted to a lower position. This enables to secure intended light amounts of laser beams to be obtained by splitting incident laser light by the splitting optical system 101, and make the luminance distribution of the split laser beams substantially uniform. In this arrangement, the laser backside irradiation device 100 is further provided with a moving mechanism for moving the beam splitter 17 in vertical direction i.e. shifting the beam splitter 17 in such a direction as to change the reflectance. Alternatively, the moving mechanism may be configured by manually moving the beam splitter 17 by a user, or by automatically moving the beam splitter 17 by a motor or a like device.

In this embodiment, the direction of changing the reflectance is aligned with a vertical direction. The invention is not specifically limited to the above. It is needless to say that the direction of changing the reflectance may be aligned with a horizontal direction. Further alternatively, all the beam splitters constituting the splitting optical system 101 shown in FIG. 1 may be constituted of the beam splitter 17 shown in FIG. 7 in plural number, or a part of the beam splitters constituting the splitting optical system 101 shown in FIG. 1 may be constituted of the beam splitter 17 shown in FIG. 7 in plural number.

In the foregoing embodiment, the beam splitter 17 changes the reflectance. The invention is not specifically limited to the above. Alternatively, the transmittance may be changed, as well as the reflectance, or at least one of the transmittance and the reflectance may be adjusted.

Figure 8:
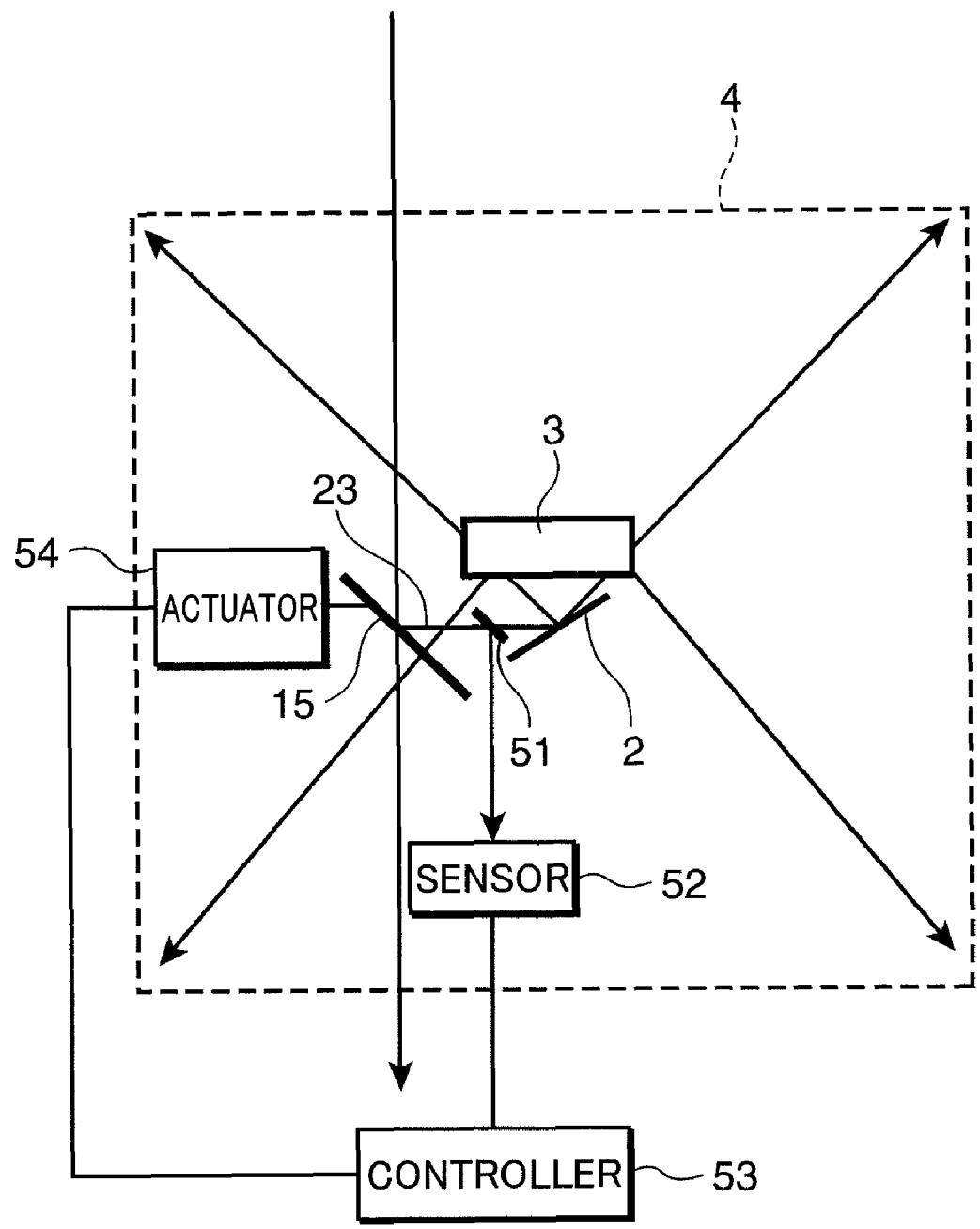
FIG. 8 is a front view showing an arrangement of a splitting optical system and an illumination optical system in a laser backside irradiation device as a third modification of the embodiment.

It is further advantageous to provide a mechanism for optimizing the light amount by automatically adjusting the position of a mirror by splitting a part of the N laser beams 22 through 24 and 26 through 34 by an unillustrated beam splitter, monitoring the light amount of the corresponding laser beam out of the N laser beams by a sensor, and mounting an actuator on the beam splitter for generating the corresponding laser beam. FIG. 8 is a front view showing an arrangement of a splitting optical system and an illumination optical system in a laser backside irradiation device as a third modification of the embodiment.

As shown in FIG. 8, a laser backside irradiation device 100 is further provided with a beam splitter 51, a sensor 52, a controller 53, and an actuator 54. The arrangement of a beam splitter 15 in the third modification is substantially the same as the arrangement of the beam splitter 17 shown in FIG. 7. The beam splitter 51 reflects a laser beam 23 reflected on the beam splitter 15 toward a sensor 52, and transmits the laser beam 23 toward a first reflecting element 2. The sensor 52 detects the light amount of the laser beam reflected on the beam splitter 51. The controller 53 controls driving of the actuator 54, and outputs a drive signal in accordance with the light amount detected by the sensor 52 to the actuator 54. The actuator 54 moves the beam splitter 15 in accordance with the drive signal outputted from the controller 53 to change an incident position of the laser beam into the beam splitter 15. The actuator 54 corresponds to an example of an adjusting section.

Next, an operation of adjusting the light amount to be performed by the laser backside irradiation device as the third modification of the embodiment is described. First, the controller 53 drives the actuator 54 to move the beam splitter 15 to an initial position. The initial position is a position where a laser beam is incident into a central portion where the reflectance is set to a design center value. Then, a laser light source 1 emits laser light. A laser beam reflected on the beam splitter 15 is reflected on the beam splitter 51 for incidence into the sensor 52. The sensor 52 detects the light amount of the incident laser beam.

Then, the controller 53 compares the light amount detected by the sensor 52 with a predetermined light amount. If it is judged that the detected light amount is lower than the predetermined light amount, the controller 53 outputs, to the actuator 54, a drive signal for moving the beam splitter 15 in such a direction as to increase the reflectance. If it is judged that the detected light amount is larger than the predetermined light amount, the controller 53 outputs, to the actuator 54, a drive signal for moving the beam splitter 15 in such a direction as to decrease the reflectance. Further, if it is judged that the detected light amount is equal to the predetermined light amount, the controller 53 outputs, to the actuator 54, a drive signal for suspending the movement of the beam splitter 15.

As described above, the light amount of a laser beam split by the beam splitter 15 is detected by the sensor 52. Then, the beam splitter 15 is moved to a position where the detected light amount is equal to the predetermined light amount by the actuator 54.

The above arrangement enables to positively increase or decrease the light amount at an intended position while the user watches TV, for instance. For instance, the controller 53 adjusts the reflectance of the beam splitter 15 so that the light amounts of the laser beam 27 and the laser beam 30 in a central portion on a screen are increased. Thereby, the luminance of the central portion on the screen, where the user normally gazes while watching TV, can be increased. Thus, visual recognition of an image can be enhanced, without increasing the light amount of laser light to be emitted from the laser light source 1.

Alternatively, at least one of the transmittance and the reflectance of a beam splitter may be adjusted depending on image data to be transmitted to a liquid crystal panel. For instance, in watching a movie on TV, the controller 53 may adjust the position of the beam splitter 15 to lower the reflectance so that the light amount of a laser beam to be incident into a targeted segment, where an image is displayed as a dark portion in e.g. a night scene, is decreased. Thereby, the light amount of a laser beam to be incident into the liquid crystal panel can be reduced to improve the contrast. It is needless to say that making the reflectance distribution of the mirror 16 non-uniform, similarly to the beam splitter 17, enables to decrease the total light amount on a screen, thereby actively controlling the light amount with respect to the entirety of the screen.

Figure 9:
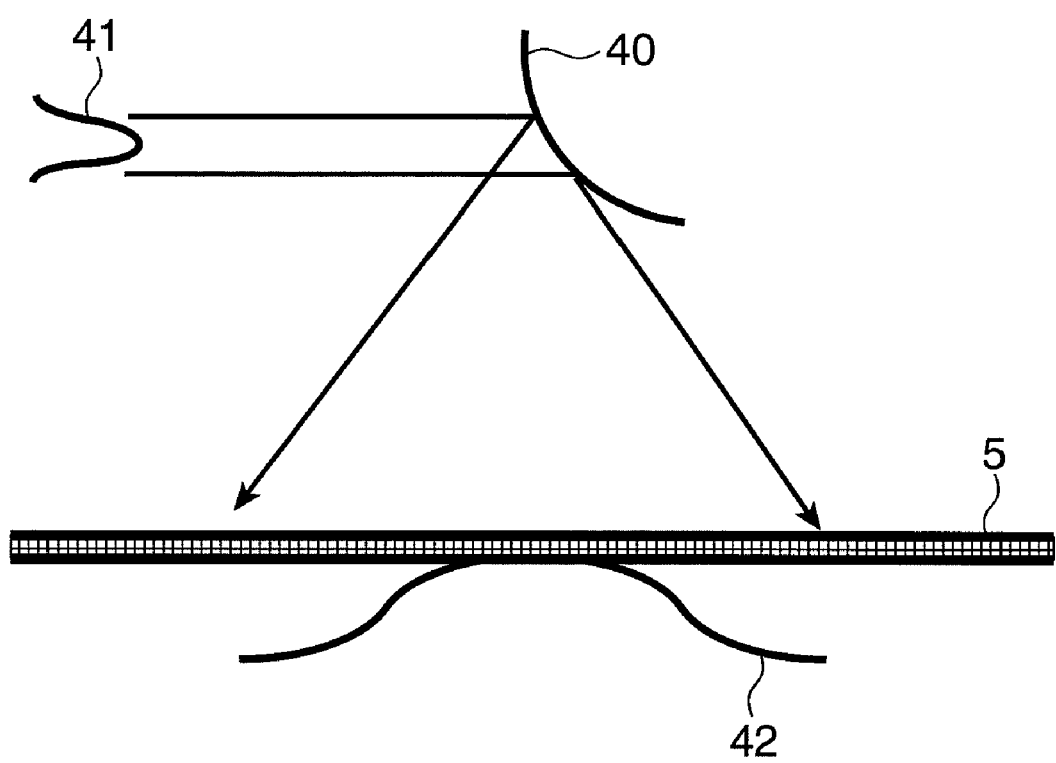
FIG. 9 is a side view of an illumination optical system incorporated with a cylinder lens as a second reflecting element in the embodiment.
Figure 10:
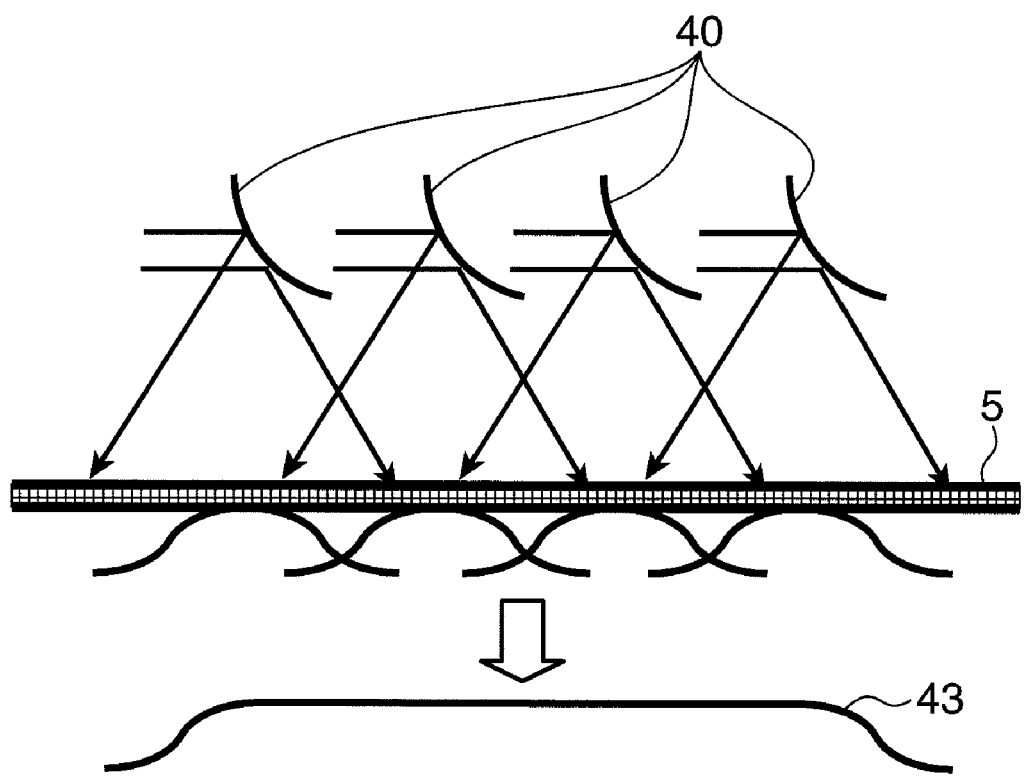
FIG. 10 is a side view of an irradiation optical system for making the luminance distribution substantially uniform by overlapping end portions of segments in the embodiment.

The above arrangement enables to make a luminance variation among the segments substantially uniform, and improve the contrast. Next, an arrangement as to how a luminance variation within a segment is made substantially uniform is described. FIG. 9 is a side view of an irradiation optical system incorporated with a cylinder lens as a second reflecting element 3 in this embodiment. FIG. 10 is a side view of the irradiation optical system for making the luminance distribution substantially uniform by overlapping end portions of the segments in this embodiment.

Normally, a first reflecting element 2 and a second reflecting element 3 constituting an illumination optical system 102 are constituted of e.g. a cylinder mirror. In this case, normally, as shown in FIG. 9, a beam profile 41 of laser light to be emitted from a laser light source 1 has a Gaussian distribution. Accordingly, as the reflection angle is increased, the light amount is decreased, and a laser beam reflected on a cylinder mirror 40 has a characteristic that the light amount of reflection light at an end portion of the cylinder mirror 40 is lowered, as shown by a beam profile 42. Further, since polarized light is rotated by a certain degree e.g. in the vicinities of apexes of a rectangle indicated by the dotted lines in FIG. 4, the light amounts in the vicinities may be lowered.

As described above, the light amounts in the vicinities of joint portions of the segments may be lowered, only if the segments to be illuminated by the illumination optical systems 102 are arranged in rows without a clearance like a tile arrangement. As a result, a luminance variation may occur when an image is viewed. In view of the above, as shown in FIG. 10, the illumination optical systems 102 are disposed at such positions that end portions of the segments are overlapped with each other. This enables to make the light amount distribution of laser beams to be irradiated onto a liquid crystal panel 5 substantially uniform, as shown by a beam profile 43.

FIG. 10 shows a state that the cylinder mirrors 40 are used as the second reflecting elements 3. It is needless to say that substantially the same effect as described above can be obtained by using a cylinder mirror as the first reflecting element 2 shown in e.g. FIG. 3. Thus, two-dimensionally disposing the segments 4 in an overlapped state, considering a polarization direction, as shown by the segment 4 indicated by the broken lines in FIG. 1, enables to obtain a uniform image with less or no luminance variation. In this arrangement, the sum of areas of the segments 4 on the liquid crystal panel 5 to be illuminated by the respective corresponding illumination optical systems 102 becomes larger than the area of the liquid crystal panel 5.

FIGS. 9 and 10 show an example, wherein the cylinder mirror 40 is used as the second reflecting element 3. A more advantageous effect can be obtained by using a lenticular mirror as the second reflecting element 3. Since the modification enables to improve luminance distribution uniformity, as compared with the arrangement of using cylinder mirrors, luminance distribution uniformity can be improved, even if the area to be overlapped is small. Thus, the number of segments i.e. the number of illumination optical systems 102 can be reduced, which leads to cost reduction.

Figure 11:
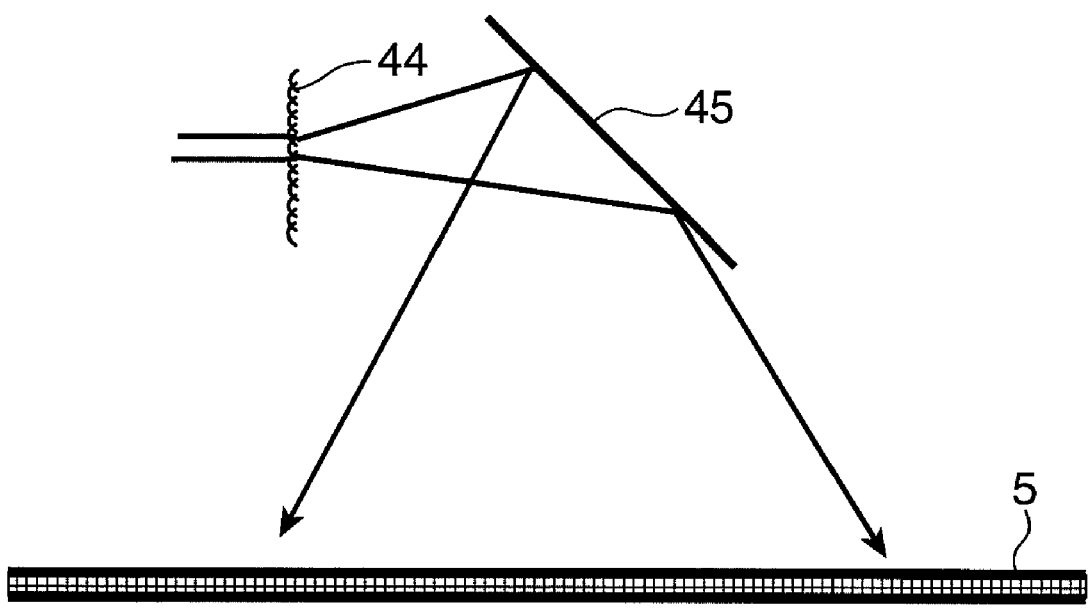
FIG. 11 is a side view of an irradiation optical system incorporated with a lenticular lens and a flat plane mirror as a second reflecting element in the embodiment.

In this embodiment, as shown in FIG. 11, substantially the same effect as described above can be realized by an arrangement of expanding a laser beam by a lenticular lens 44, and folding the expanded laser beam on a flat plane mirror 45. FIG. 11 is a side view of an irradiation optical system incorporated with a lenticular lens and a flat plane mirror as a second reflecting element in this embodiment. Generally, the angle of a beam to be expanded by a lenticular lens is small, as compared with an arrangement of using a reflecting element such as a lenticular mirror. Accordingly, as compared with the arrangement of using a lenticular mirror, in the case where a lenticular lens is used, an optical path length from the flat plane mirror 45 (second reflecting element 3) to a liquid crystal panel 5 is increased.

As a result, even in use of the arrangement of folding a laser beam on the flat plane mirror 45, as shown in FIG. 11, if the flat plane mirror 45 is disposed near the lenticular lens 44 to fold a laser beam, the optical path length from the flat plane mirror 45 to the liquid crystal panel 5 is increased, which makes it difficult to reduce the thickness of the device. On the contrary, if the flat plane mirror 45 is disposed away from the lenticular lens 44 to fold a laser beam, since the laser beam is already diffused, the length of the flat plane mirror 45 is increased, which also makes it difficult to reduce the thickness of the device.

On the other hand, use of cylinder mirrors or lenticular mirrors as the second reflecting elements 3 as shown in FIG. 10 enables to reduce the distance from the cylinder mirrors 40 to the liquid crystal panel 5, since the divergent angle of a reflected beam can be increased by reducing the curvature radius of the mirror. Thus, the thickness of the device can be reduced. Also, even if a laser light source for emitting laser light of three colors of R (red), G (green), and B (blue) is used, a desirable image can be obtained with no or less likelihood that a color variation resulting from a refractive index distribution non-uniformity, as observed in use of a transmitting element, may occur, because a reflecting element is used.

Figure 12:
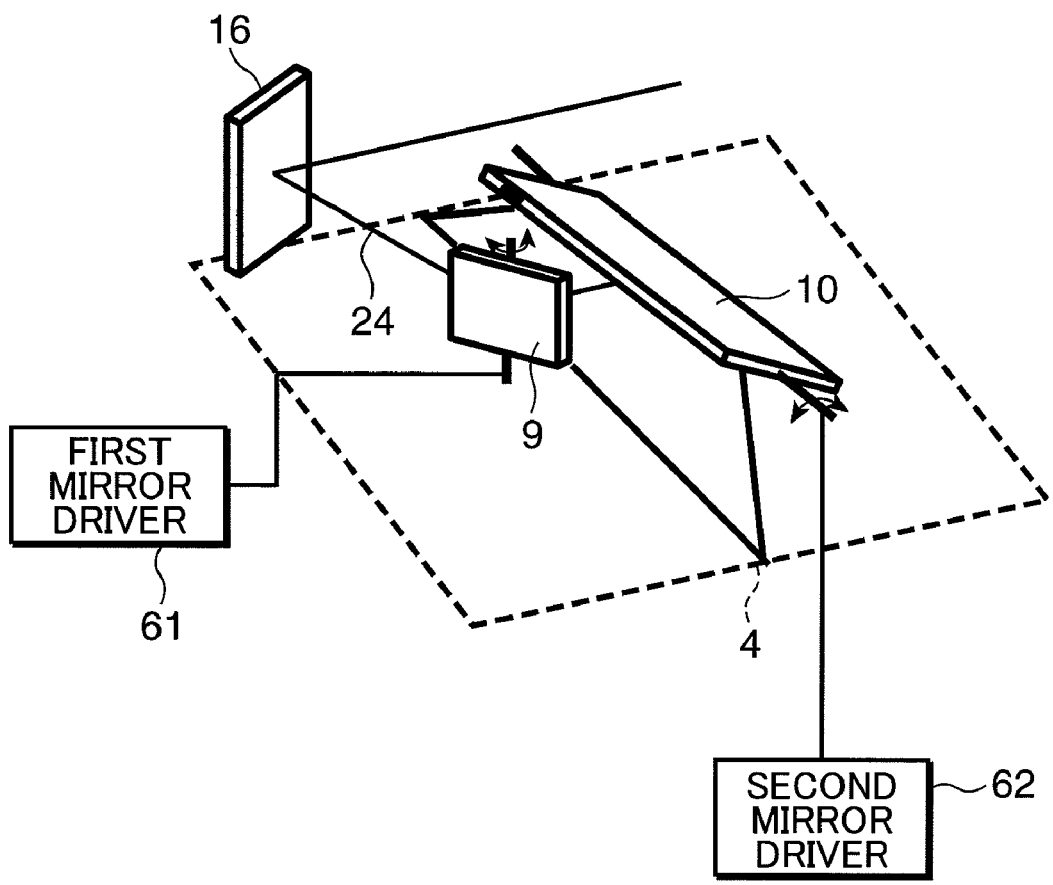
FIG. 12 is a perspective view enlargedly showing one of N illumination optical systems in a fourth modification of the embodiment.

Next, another method for making a luminance variation within a segment substantially uniform is described referring to FIG. 12. In FIGS. 9 through 11, the liquid crystal panel 5 is illuminated without driving a reflecting element, by reflecting light on a reflecting element such as a cylinder mirror or a lenticular mirror. In FIG. 12, a liquid crystal panel is illuminated by driving a reflecting element.

FIG. 12 is a diagram enlargedly showing one of N illumination optical systems in a fourth modification of the embodiment. A first reflecting element 2 and a second reflecting element 3 are respectively constituted of a flat plane mirror 9 and a flat plane mirror 10. The flat plane mirror 9 and the flat plane mirror 10 are rotatably oscillated about rotating axes thereof, respectively. The flat plane mirror 9 is rotatably oscillated about a vertical axis thereof to one-dimensionally scan a laser beam. The flat plane mirror 10 is rotatably oscillated about a horizontal axis thereof to two-dimensionally scan a laser beam reflected on the flat plane mirror 9. A first mirror driver 61 rotatably oscillates the flat plane mirror 9 about the vertical axis along a direction perpendicular to an irradiation plane, as a rotation axis. A second mirror driver 62 rotatably oscillates the flat plane mirror 10 about the horizontal axis along a direction in parallel to the irradiation plane, as a rotation axis. The first mirror driver 61 and the second mirror driver 62 correspond to an example of a mirror driving section.

Optimizing the scanning speed of the flat plane mirror 9, 10 enables to uniformly expose the segments to light. Also, since a laser beam is scanned, a speckle noise can be reduced. Further, aligning the rotation axis of the flat plane mirror 10 along the horizontal direction with the rotation axis of the flat plane mirror 10 in an adjoining illumination optical system 102 enables to reduce the number of actuators (second mirror driver 62) to be rotatably oscillated.

It is needless to say that the liquid crystal panel 5 may be directly and two-dimensionally scanned by an MEMS (Micro Electro Mechanical Systems) mirror or a like device. The above method is advantageous in obtaining a desirable image with no or less likelihood that a color variation resulting from a refractive index distribution non-uniformity, as observed in use of a transmitting element, may occur, even in use of a laser light source for emitting light of three colors of R (red), G (green), and B (blue), because a member constituting the above system is a reflecting element.

Figure 13:
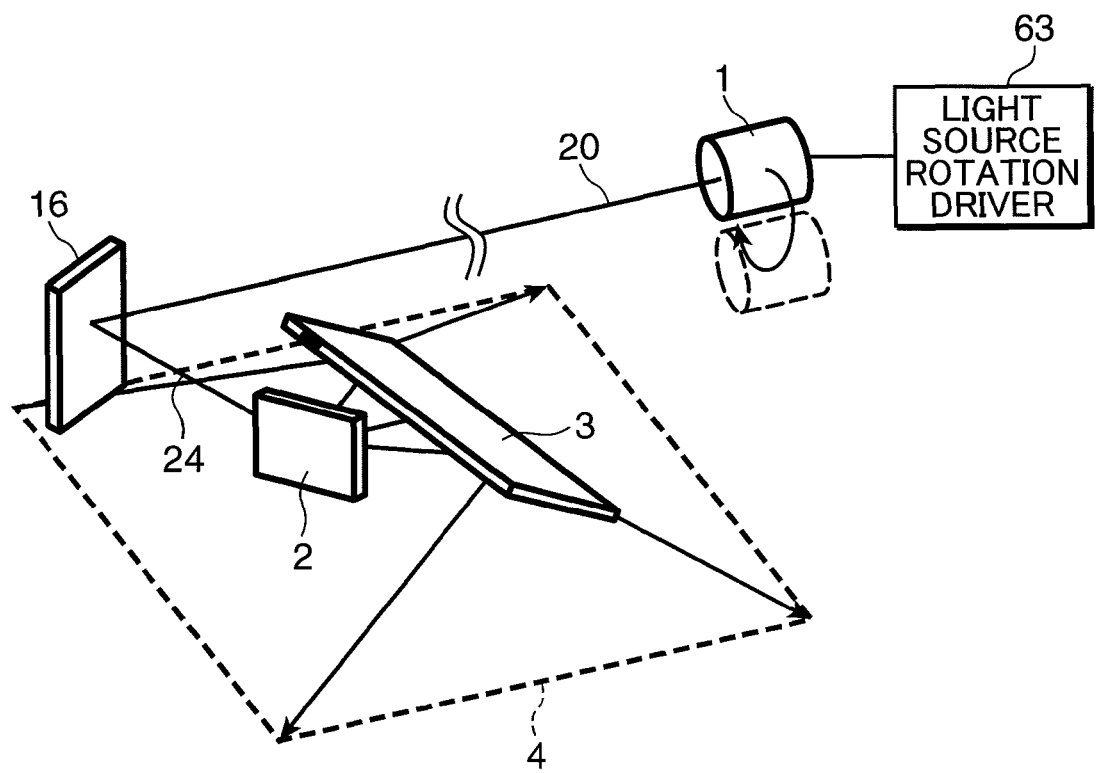
FIG. 13 is a perspective view enlargedly showing a laser light source, and one of N illumination optical systems in a fifth modification of the embodiment.

Next, another method for making a luminance variation within a segment substantially uniform is described referring to FIG. 13. Constituent elements in FIG. 13 are substantially the same as those in FIG. 1, but in this example, a laser light source 1 is two-dimensionally rotated in a plane perpendicular to an optical axis.

FIG. 13 is a perspective view enlargedly showing a laser light source, and one of N illumination optical systems in a fifth modification of the embodiment. As shown in FIG. 13, a laser backside irradiation device is further provided with a light source rotation driver 63. The light source rotation driver 63 two-dimensionally rotates a laser light source 1 in a plane perpendicular to the optical axis of laser light. The light source rotation driver 63 corresponds to an example of a light source driving section.

In the above arrangement, the optical axis of laser light 20 emitted from the laser light source 1 is circularly rotated, and the optical path of a propagating laser beam 24 is also circularly rotated. Thereby, an area to be illuminated by an illumination optical system 102 is also rotated. As a result, an overlapped area is generated in a segment adjacent to a targeted segment to be illuminated. A luminance variation can be made substantially uniform, as compared with a condition before oscillation, because the intensities of light exposure are time-integrated.

Since the laser light source 1 is rotated, a speckle noise can be reduced. Also, rotatably driving the laser light source 1 means that merely the laser light source 1 is to be driven. Thus, the above arrangement can be made simplified, as compared with the aforementioned method for scanning the flat plane mirror 9, 10, thereby maximally suppressing a cost increase. It is needless to say that the method for scanning the liquid crystal panel 5 by the flat plane mirror 9, 10, and the method for rotatably oscillating the laser light source 1 may be combined. Combined use of the above two methods is advantageous in enhancing the luminance distribution uniformity, and reducing a speckle noise.

Figure 14:
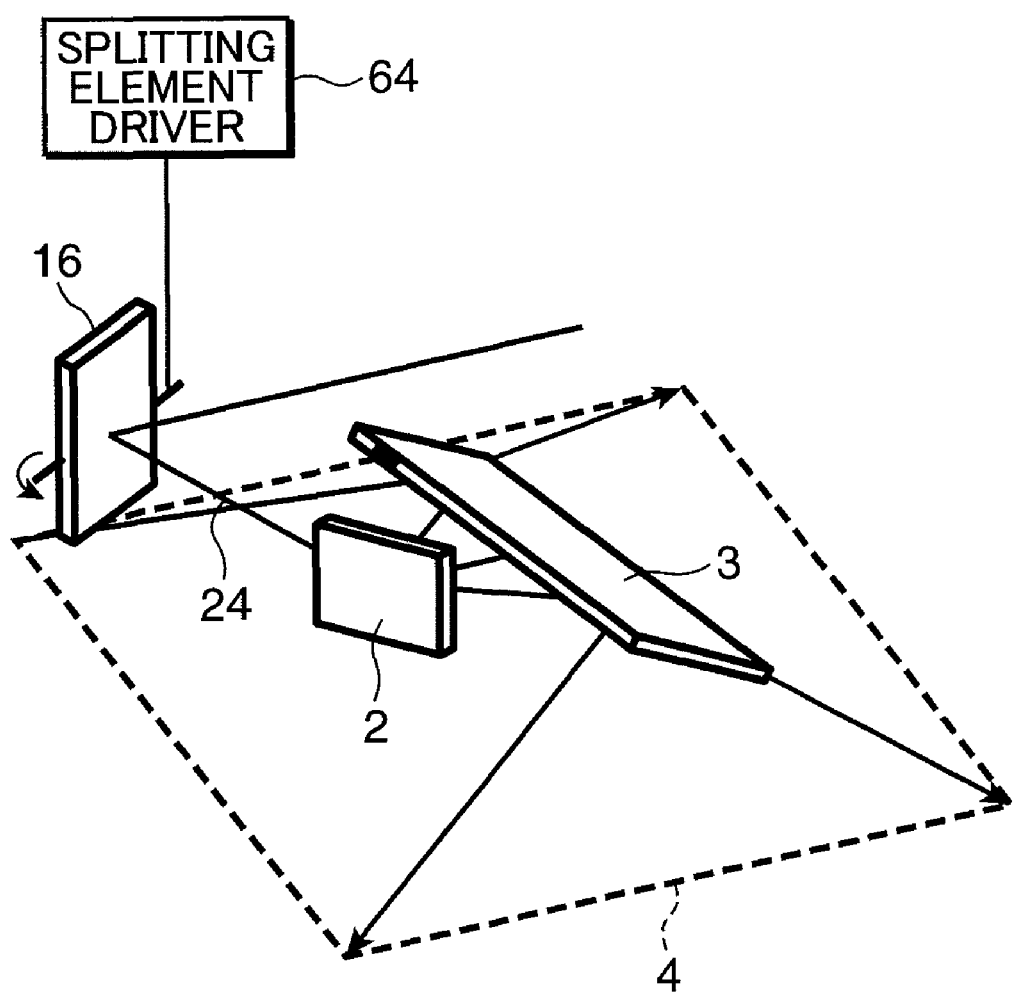
FIG. 14 is a perspective view enlargedly showing one of N illumination optical systems in a sixth modification of the embodiment.

As another method for oscillating a laser beam, N splitting elements, in the splitting optical system, such as beam splitters and mirrors for splitting laser light into N laser beams may be oscillated. FIG. 14 is a perspective view enlargedly showing one of N illumination optical systems in a sixth modification of the embodiment. As shown in FIG. 14, a laser backside irradiation device is further provided with a splitting element driver 64. The splitting element driver 64 rotatably oscillates a mirror 16, in a splitting optical system 101, about a horizontal axis along a direction in parallel to the irradiation plane, as a rotation axis. Beam splitters 11, 12, 13, 14, and 15, and mirrors 16 correspond to examples of splitting elements, and the splitting element driver 64 corresponds to an example of a splitting element driving section.

As shown in FIG. 14, the splitting element driver 64 rotatably oscillates e.g. the mirror 16 in the splitting optical system 101 about a rotation axis thereof. Thereby, the optical path posterior to a laser beam 24 reflected on the mirror 16 is oscillated. As a result, an overlapped portion is generated in a segment adjacent to a targeted segment, thereby improving the luminance distribution uniformity. In FIG. 14, rotational oscillation about a rotation axis in parallel to a horizontal direction is described. The invention is not specifically limited to the above. The rotation axis of the mirror 16 may be aligned in parallel to a vertical direction. It is needless to say that the mirror 16 may be rotatably oscillated about axes in a horizontal direction and a vertical direction, with use of an MEMS mirror or a like device.

The laser light source to be used in this embodiment may be a light source for emitting light of three primary colors of red (R), green (G), and blue (B). For instance, a fiber white light source obtained by bundling a red optical fiber, a green optical fiber, and a blue optical fiber may be used, as the laser light source 1 shown in FIG. 1. Further alternatively, a liquid crystal panel may be illuminated from the backside thereof, using a laser backside irradiation device incorporated with a laser light source for emitting light of three primary colors of RGB. In the modification, a full-color liquid crystal display with a reduced thickness, high light use efficiency, uniform luminance distribution, and high contrast can be fabricated at a low cost.

Figure 15:
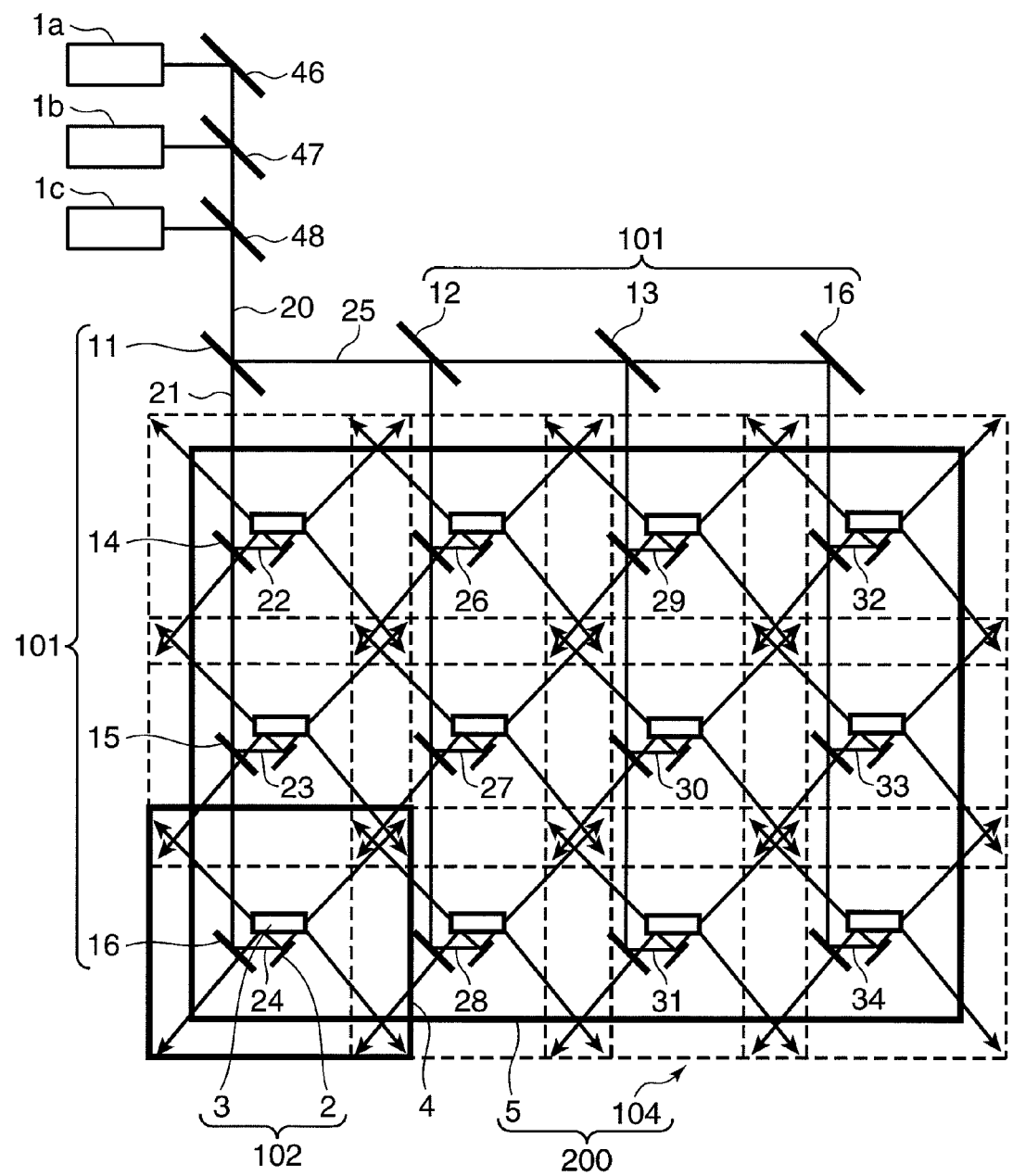
FIG. 15 is a front view showing an arrangement of a liquid crystal display device as a seventh modification of the embodiment.

FIG. 15 is a front view showing an arrangement of a liquid crystal display device as a seventh modification of the embodiment. Constituent elements in FIG. 15 substantially identical or equivalent to those of the liquid crystal display device shown in FIG. 1 are indicated with the same reference numerals, and description thereof is omitted herein. A laser backside irradiation device 104 shown in FIG. 15 is further provided with a red laser light source 1a, a green laser light source 1b, a blue laser light source 1c, a mirror 46, a beam splitter 47, and a beam splitter 48.

The red laser light source 1a emits red laser light. The green laser light source 1b emits green laser light. The blue laser light source 1c emits blue laser light. The mirror 46 reflects the red laser light emitted from the red laser light source 1a. The beam splitter 47 transmits the red laser light reflected on the mirror 46, and reflects the green laser light emitted from the green laser light source 1b. The beam splitter 48 transmits the red laser light transmitted through the beam splitter 47, transmits the green laser light reflected on the beam splitter 47, and reflects the blue laser light emitted from the blue laser light source 1c.

The laser light emitted from the laser light sources 1a, 1b, and 1c is coaxially incident into a beam splitter 11. Since the operation of coaxially aligned laser light 20 after incidence into the beam splitter 11 is substantially the same as the operation to be performed by the laser backside irradiation device 100 shown in FIG. 1, description thereof is omitted herein.

The foregoing embodiment and modifications mainly include the features having the following arrangements.

A laser backside irradiation device according to an aspect of the invention includes: a laser light source; a splitting optical system for splitting laser light emitted from the laser light source into a plurality of laser beams; and a plurality of illumination optical systems for illuminating a two-dimensional spatial modulator for two-dimensionally modulating a light intensity from a backside thereof, wherein the illumination optical systems expand the laser beams split by the splitting optical system to illuminate divided regions on the two-dimensional spatial modulator, respectively.

According to the above arrangement, since the divided regions on the two-dimensional spatial modulator are illuminated by the illumination optical systems, respectively, even if the size of the two-dimensional spatial modulator is increased, the thickness of the device can be reduced without changing the thickness of the device, by increasing the number of regions to be divided. Further, since the divided regions on the two-dimensional spatial modulator are illuminated by the illumination optical systems, respectively, the contrast can be improved, while making the luminance distribution of light to be irradiated onto the two-dimensional spatial modulator substantially uniform.

Preferably, in the laser backside irradiation device, propagating directions of all the laser beams to be incident into the illumination optical systems may be substantially identical to each other, or propagating directions of a part of the laser beams may be opposite to propagating directions of the other part thereof, and all the illumination optical systems have arrangements identical to each other.

According to the above arrangement, since the propagating directions of all the laser beams to be incident into the illumination optical systems are substantially identical to each other, or the propagating directions of a part of the laser beams are opposite to the propagating directions of the other part thereof, polarization directions of the laser beams for illumination can be aligned with each other, thereby improving the light use efficiency. Also, since all the illumination optical systems have arrangements identical to each other, an increase in the production cost can be suppressed.

Preferably, in the laser backside irradiation device, the splitting optical system may include a plurality of splitting elements for splitting the laser light emitted from the laser light source into the laser beams by transmission and reflection, and at least one of a transmittance and a reflectance of each of the splitting elements may be adjustable.

According to the above arrangement, since at least one of the transmittance and the reflectance of each of the splitting elements for splitting the laser light emitted from the laser light source into the laser beams by transmission and reflection is adjustable, a luminance variation among the regions can be adjusted.

Preferably, in the laser backside irradiation device, the splitting optical system may include at least one beam splitter, and at least one of a transmission and a reflection of the beam splitter may be made non-uniform in a plane thereof.

According to the above arrangement, since at least one of the transmission and the reflection of the beam splitter is made non-uniform in the plane thereof, a luminance variation among the regions can be adjusted by aligning an incident position of laser beam with a position on the beam splitter where an intended light amount is obtained.

Preferably, in the laser backside irradiation device, each of the illumination optical systems may include a sensor for detecting a light amount of the laser beam split by the beam splitter, and the laser backside irradiation device may further include an adjusting section for adjusting at least one of the transmittance and the reflectance of the beam splitter so that the light amount to be detected by the sensor is made equal to a predetermined light amount.

According to the above arrangement, the light amount of the laser beam split by the beam splitter is detected, and at least one of the transmittance and the reflectance of the beam splitter is adjusted so that the light amount to be detected is made equal to the predetermined light amount. Thus, since the light amount of the laser beam to be transmitted through the beam splitter is made equal to the predetermined light amount, a luminance variation among the regions can be adjusted.

Preferably, in the laser backside irradiation device, the adjusting section may adjust at least one of the transmittance and the reflectance of the beam splitter in accordance with image data to be transmitted to the two-dimensional spatial modulator.

According to the above arrangement, since at least one of the transmittance and the reflectance of the beam splitter is adjusted in accordance with image data to be transmitted to the two-dimensional spatial modulator, luminances of the respective regions can be adjusted in accordance with the image data, and an image with an improved contrast can be provided.

Preferably, in the laser backside irradiation device, the sum of areas of the regions on the two-dimensional spatial modulator to be illuminated by the illumination optical systems respectively may be set larger than an area of the two-dimensional spatial modulator.

According to the above arrangement, since the adjacent regions are illuminated in an overlapped state, incongruity between the regions can be eliminated, and a luminance variation among the regions can be adjusted.

Preferably, in the laser backside irradiation device, each of the illumination optical systems may include at least a lenticular mirror or at least a cylinder mirror.

According to the above arrangement, the divergent angle of a reflected laser beam can be increased by reducing the curvature radius of the lenticular mirror or the cylinder mirror. Thereby, the thickness of the laser backside irradiation device can be realized.

Preferably, in the laser backside irradiation device, the illumination optical systems may include at least a mirror, and the laser backside irradiation device may further include a mirror driving section for rotatably oscillating the mirror.

According to the above arrangement, since the mirror is rotatably oscillated, the luminance distribution can be made substantially uniform with respect to the regions, and a speckle noise can be reduced.

Preferably, the laser backside irradiation device may further include a light source driving section for two-dimensionally rotating the laser light source in a plane perpendicular to an optical axis of the laser light.

According to the above arrangement, since the laser light source is two-dimensionally rotated in the plane perpendicular to the optical axis of the laser light, the luminance distribution can be made substantially uniform with respect to the regions, and a speckle noise can be reduced.

Preferably, in the laser backside irradiation device, the splitting optical system may include a plurality of splitting elements for splitting the laser light into the laser beams toward the illumination optical systems, the laser backside irradiation device may further include a splitting element driving section for oscillating each of the splitting elements, and the splitting element driving section may oscillate optical paths of the laser beams split by the splitting elements.

According to the above arrangement, since the optical paths of the laser beams split by the splitting elements are oscillated, the luminance distribution can be made substantially uniform with respect to the regions, and a speckle noise can be reduced.

Preferably, in the laser backside irradiation device, the splitting optical system may include a plurality of splitting elements for allowing the laser beams to be incident into the illumination optical systems, respectively, and each of the illumination optical systems may include a first reflecting element for reflecting the laser beam incident from the corresponding splitting element, and a second reflecting element for reflecting the laser beam reflected on the first reflecting element toward the predetermined corresponding region on the two-dimensional spatial modulator.

According to the above arrangement, the laser beam incident from the corresponding splitting element is reflected on the first reflecting element, and the laser beam reflected on the first reflecting element is reflected on the second reflecting element toward the predetermined corresponding region on the two-dimensional spatial modulator, in each of the illumination optical systems. Accordingly, the laser beams split by the splitting elements can be guided to the two-dimensional spatial modulator.

Preferably, in the laser backside irradiation device, the laser light source may emit the laser light of red, green, and blue.

According to the above arrangement, since the laser light of red, green, and blue can be emitted by the laser light source, a laser backside irradiation device capable of displaying a full-color image can be provided.

A liquid crystal display device according to another aspect of the invention includes: the aforementioned laser backside irradiation device, and a two-dimensional spatial modulator to be irradiated by the laser backside irradiation device, and for two-dimensionally modulating a light intensity.

According to the above arrangement, a liquid crystal display device with a reduced thickness, and capable of improving the contrast, while making the luminance distribution substantially uniform can be provided.

INDUSTRIAL APPLICABILITY

The inventive laser backside irradiation device is capable of reducing the thickness of the device, and improving the contrast while making the luminance distribution substantially uniform, and accordingly is useful as a laser backside irradiation device incorporated with a light source for emitting light of mainly three colors of R (red), G (green), and B (blue), and a liquid crystal display device incorporated with the laser backside irradiation device.

The invention claimed is:
1. A laser backside irradiation device comprising:
a laser light source;
a splitting optical system for splitting laser light emitted from the laser light source into a plurality of laser beams; and
a plurality of illumination optical systems for illuminating a two-dimensional spatial modulator for two-dimensionally modulating a light intensity from a backside thereof,
wherein the illumination optical systems, of the plurality of illumination optical systems, respectively and two-dimensionally expand the plurality of laser beams split by the splitting optical system to illuminate divided regions on the two-dimensional spatial modulator, respectively,
wherein the splitting optical system includes a plurality of splitting elements for splitting the laser light emitted from the laser light source into the plurality of laser beams by transmission and reflection, and
wherein at least one of a transmittance and a reflectance of each splitting element of a plurality of splitting elements is adjustable.

2. The laser backside irradiation device according to claim 1,
wherein propagating directions of all laser beams, of the plurality of laser beams, to be incident to the plurality of illumination optical systems are substantially identical to each other, or propagating directions of a portion of laser beams, of the plurality of laser beams, are opposite to propagating directions of another portion of laser beams of the plurality of laser beams, and
wherein all of the illumination optical systems of the plurality of illumination optical systems have arrangements identical to each other.

3. The laser backside irradiation device according to claim 1,
wherein the splitting optical system includes at least one beam splitter, and
wherein at least one of a transmission and a reflection of the at least one beam splitter is non-uniform in a plane thereof.

4. The laser backside irradiation device according to claim 1,
wherein each illumination optical system, of the plurality of illumination optical systems, includes a sensor for detecting a light amount of a laser beam, of the plurality of laser beams, split by a splitting element of the plurality of splitting elements, and
wherein the laser backside irradiation device further includes an adjusting section for adjusting at least one of the transmittance and the reflectance of the splitting element so that the light amount to be detected by the sensor is equal to a predetermined light amount.

5. The laser backside irradiation device according to claim 4, wherein the adjusting section adjusts at least one of a transmittance and a reflectance of a beam splitter of the splitting optical system in accordance with image data to be transmitted to the two-dimensional spatial modulator.

6. A laser backside irradiation device comprising:
a laser light source;
a splitting optical system for splitting laser light emitted from the laser light source into a plurality of laser beams; and
a plurality of illumination optical systems for illuminating a two-dimensional spatial modulator for two-dimensionally modulating a light intensity from a backside thereof,
wherein the illumination optical systems, of the plurality of illumination optical systems, respectively and two-dimensionally expand the plurality of laser beams split by the splitting optical system to illuminate divided regions on the two-dimensional spatial modulator, respectively, and
wherein a sum of areas of the divided regions on the two-dimensional spatial modulator to be illuminated by the plurality of illumination optical systems respectively is set larger than an area of the two-dimensional spatial modulator.

7. The laser backside irradiation device according to claim 6, wherein each illumination optical system of the plurality of illumination optical systems includes at least a lenticular mirror or at least a cylinder mirror.

8. The laser backside irradiation device according to claim 6,
wherein the plurality of illumination optical systems includes at least a mirror, and
wherein the laser backside irradiation device further includes a mirror driving section for rotatably oscillating the mirror.

9. A laser backside irradiation device comprising:
a laser light source;
a splitting optical system for splitting laser light emitted from the laser light source into a plurality of laser beams;
a plurality of illumination optical systems for illuminating a two-dimensional spatial modulator for two-dimensionally modulating a light intensity from a backside thereof; and
a light source driving section for two-dimensionally rotating the laser light source in a plane perpendicular to an optical axis of the laser light,
wherein the illumination optical systems, of the plurality of illumination optical systems, respectively and two-dimensionally expand the plurality of laser beams split by the splitting optical system to illuminate divided regions on the two-dimensional spatial modulator, respectively.

10. A laser backside irradiation device comprising:
a laser light source;
a splitting optical system for splitting laser light emitted from the laser light source into a plurality of laser beams; and
a plurality of illumination optical systems for illuminating a two-dimensional spatial modulator for two-dimensionally modulating a light intensity from a backside thereof,
wherein the illumination optical systems, of the plurality of illumination optical systems, respectively and two-dimensionally expand the plurality of laser beams split by the splitting optical system to illuminate divided regions on the two-dimensional spatial modulator, respectively,
wherein the splitting optical system includes a plurality of splitting elements for splitting the laser light into the plurality of laser beams toward the plurality of illumination optical systems,
wherein the laser backside irradiation device further includes a splitting element driving section for oscillating each splitting element of the plurality of splitting elements, and
wherein the splitting element driving section oscillates optical paths of the plurality of laser beams split by the plurality of splitting elements.

11. A laser backside irradiation device comprising:
a laser light source;
a splitting optical system for splitting laser light emitted from the laser light source into a plurality of laser beams; and
a plurality of illumination optical systems for illuminating a two-dimensional spatial modulator for two-dimensionally modulating a light intensity from a backside thereof,
wherein the illumination optical systems, of the plurality of illumination optical systems, respectively and two-dimensionally expand the plurality of laser beams split by the splitting optical system to illuminate divided regions on the two-dimensional spatial modulator, respectively,
wherein the splitting optical system includes a plurality of splitting elements for allowing the plurality of laser beams to be incident to the plurality of illumination optical systems, respectively, and wherein each illumination optical system of the plurality of illumination optical systems includes a first reflecting element for reflecting a laser beam, of the plurality of laser beams, incident from a corresponding splitting element of the plurality of splitting elements, and includes a second reflecting element for reflecting the laser beam reflected by the first reflecting element toward a predetermined corresponding region on the two-dimensional spatial modulator.

12. The laser backside irradiation device according to claim 1, wherein the laser light source emits a red laser light, a green laser light, and a blue laser light.

13. A liquid crystal display device comprising:

the laser backside irradiation device of claim 1; and a two-dimensional spatial modulator to be irradiated by the laser backside irradiation device, and for two-dimensionally modulating a light intensity.

14. A liquid crystal display device comprising:

the laser backside irradiation device according to claim 6; and a two-dimensional spatial modulator to be irradiated by the laser backside irradiation device, and for two-dimensionally modulating a light intensity.

15. A liquid crystal display device comprising:

the laser backside irradiation device according to claim 9; and a two-dimensional spatial modulator to be irradiated by the laser backside irradiation device, and for two-dimensionally modulating a light intensity.

16. A liquid crystal display device comprising:

the laser backside irradiation device according to claim 10; and a two-dimensional spatial modulator to be irradiated by the laser backside irradiation device, and for two-dimensionally modulating a light intensity.

17. A liquid crystal display device comprising:

the laser backside irradiation device according to claim 11; and a two-dimensional spatial modulator to be irradiated by the laser backside irradiation device, and for two-dimensionally modulating a light intensity.

* * * * *